W. S. AUSTIN.
SPRING SUSPENSION FOR AUTOMOBILES.
APPLICATION FILED DEC. 12, 1914.
1,291,356.
Patented Jan. 14, 1919.
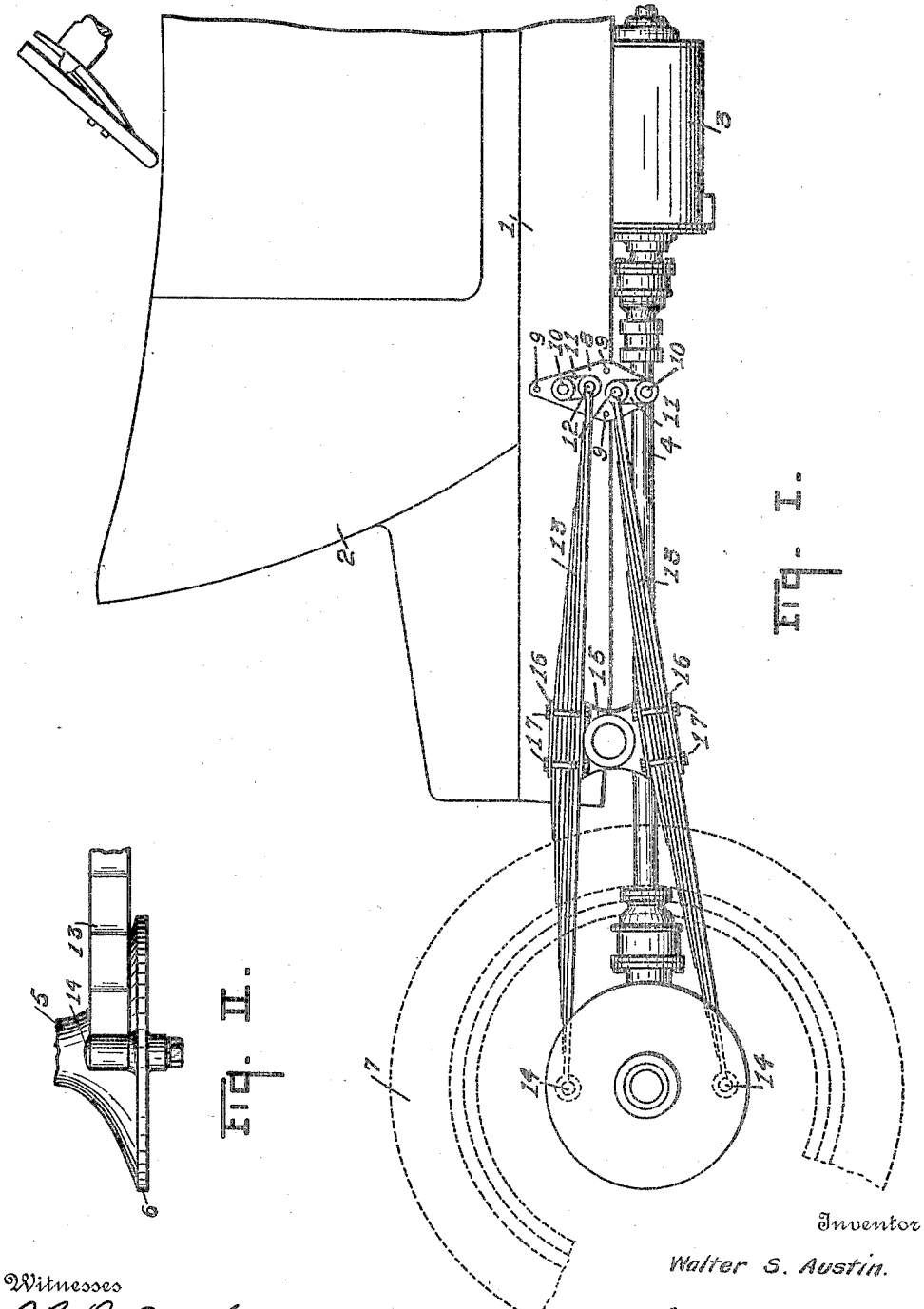

UNITED STATES PATENT OFFICE.

WALTER S. AUSTIN, OF GRAND RAPIDS, MICHIGAN.

SPRING SUSPENSION FOR AUTOMOBILES.

1,291,356.   Specification of Letters Patent.   Patented Jan. 14, 1919.

Application filed December 12, 1914. Serial No. 876,974.

*To all whom it may concern:*

Be it known that I, WALTER S. AUSTIN, a citizen of the United States, residing at the city of Grand Rapids, county of Kent, and State of Michigan, have invented certain new and useful Improvements in Spring Suspensions for Automobiles, of which the following is a specification.

This invention relates to improvements in spring suspension for automobiles.

The object of this invention is to provide an improved spring suspension especially adapted for automobiles which secures easier riding qualities and makes possible the elimination of torsion rods or a torsion tube and of radius rods.

Further objects, and objects relating to details and economies of construction and operation will definitely appear from the detailed description to follow.

I accomplish the objects of my invention by the devices and means described in the following specification. The invention is clearly defined and pointed out in the claims.

A structure constituting a preferred embodiment of my invention is illustrated in the accompanying drawing forming a part of this specification, in which:

Figure I is a view in side elevation of an automobile equipped with my improved spring suspension, a portion of the chassis and body being broken away and the wheels being shown in dotted lines.

Fig. II is a fragmentary top plan view showing in detail the connections for the rear end of one of the cantaliver springs.

In the drawing, similar reference characters refer to similar parts throughout the several views.

Considering the numbered parts of the drawing, I have shown an automobile chassis consisting of a frame 1, supporting the body 2, gear box 3, propeller shaft 4, rear axle housing 5, brake flanges 6 and wheels 7. The construction of these parts forms no part of my invention and the same may be of the usual or any desired construction as my improved spring suspension may be applied to any form of chassis construction.

I provide at each side of the frame a pair of cantaliver springs, the rear ends of which are connected to the brake flange while the forward ends are connected to the side of the chassis frame.

A bracket 8 is secured to the side of the frame 1 by bolts 9 and carries a pair of laterally projecting pins 10. A shackle link 11 is pivotally mounted on each of said pins 10 and carries on its free end a laterally projecting pin 12 to which the forward end of one of the cantaliver springs 13 is secured. The brake flange 6 carries a pair of laterally projecting pins 14, said pins being carried upon said brake flange, one above and the other below the rear axle. The rear ends of the cantaliver springs 13 are mounted on said pins. A block 15 is disposed between the centers of the cantaliver spring and clips 16 are provided engaging the springs and secured to the block 15 by means of the bolts 17. The construction on both sides of the frame is the same and hence, I have shown and described the construction at one side only.

By means of my improved spring suspension, I am enabled to secure several important advantages, among which are the following. First, I secure very much better riding qualities as this spring suspension makes an easier riding car. By using a pair of cantaliver springs instead of a single elliptic spring, I am enabled to use lighter springs without sacrificing strength of construction and hence, get an easier riding car. By means of this double cantaliver spring suspension, I eliminate the objectionable side sway which is present in an elliptic spring suspension or in a single cantaliver spring suspension. Second, I am enabled by this spring suspension to do away with torsion rods or a torsion tube. The cantaliver springs connect the rear axle housing with the chassis frame and do the work of the usual torsion rods in that they prevent the rear axle housing from rotating and hold the rear axle housing and the differential gearing carried thereby in proper relation to the propeller shaft. Third, by using this spring suspension I can also eliminate the radius rods as the cantaliver springs connect the rear axle housing with the chassis frame and hold the housing at right angles to the frame and hold the differential gearing carried thereby in proper relation to the propeller shaft. Fourth, by using the double cantaliver spring suspension in this connection, in case one of the cantaliver springs should break, the driver would by careful driving be able to manipulate the car and get it to its destination, whereas, in the usual construction, if a radius rod or a torsion rod should break, the car would be put out of commission, and if, in a construction in which a single cantaliver spring is used, the spring should break, the car would also be put out of commission. It will therefore be seen that, with this construction of spring suspension, if any one of the cantaliver springs should break, the car would not be put out of commission but could be brought to its destination by careful driving. The advantages which are secured from my improved spring suspension are easier riding, the elimination of torsion rods or a torsion tube, the elimination of radius rods and double safety against the liability of being put out of commission by the breaking of a spring, radius rod, or a torsion rod or tube.

I am aware that the particular structure which I have here shown is susceptible of considerable variation without departing from the spirit of my invention, and therefore I do not wish to be restricted to the same. I have found, however, that this particular structure is to be preferred, and therefore I desire to claim the same specifically as well as broadly as indicated by my appended claims.

While I have specified that the rear ends of these springs be connected to the brake flange and desire to claim the same specifically, such details of construction may be modified, and I desire to claim this disposition of spring broadly. While I have shown a bracket or plate on the side of the chassis for connection, it would be possible to provide connections without such special part. While I have shown a propeller shaft in proper relation, here, and this connection is of special advantage in preserving the proper relation between the rear axle parts and the said propeller shaft, and I desire to claim it specifically, yet my spring suspension also is adapted to use with any other kind of propelling means, and I wish to claim it generally and also in such relation.

Having thus described my invention, what I claim as new and desire to secure by Letters Patent is:

1. In a spring suspension for automobiles, the combination with the chassis frame, rear axle, rear axle housing, and brake flange; of a bracket secured to the frame; a pair of shackle links pivotally mounted on said bracket; a pair of laterally projecting pins disposed on said brake flange above and below the rear axle; a pair of cantaliver springs disposed one above the other, the rear ends of said springs being connected to the pins on said brake flange, and the forward ends of said springs being connected to said shackle links; a block interposed between the center of said springs and connected to the chassis frame; and means securing said springs to said block, all coacting substantially as described and for the purpose specified.

2. In a spring suspension for automobiles, the combination with the chassis frame, rear axle, rear axle housing, and brake flange; of a bracket secured to the frame; a pair of shackle links pivotally mounted on said bracket; a pair of laterally projecting pins disposed on said brake flange above and below the rear axle; a pair of cantaliver springs disposed one above the other, the rear ends of said springs being connected to the pins on said brake flange, and the forward ends of said springs being connected to said shackle links; and a block interposed between the centers of said springs and connected to the chassis frame; all coacting substantially as described and for the purpose specified.

3. In a spring suspension for automobiles, the combination with the chassis frame, rear axle, rear axle housing, and brake flange; of a bracket secured to the frame; a pair of shackle links pivotally mounted on said bracket with the free ends of the links extended toward and closely approaching each other; a pair of laterally projecting pins disposed on said brake flange above and below the rear axle adjacent the edges of the flange; a pair of cantaliver springs disposed one above the other, the rear ends of said springs being connected to the pins on said brake flange, and the forward ends of said springs being connected to the free ends of said shackle links and a supporting block interposed between said springs and having forwardly converging upper and lower faces, the springs converging in a forward direction and secured to the converging faces of said block, said block being connected to the chassis frame; all coacting substantially as described and for the purpose specified.

4. In a spring suspension for automobiles, the combination with the chassis frame, rear axle, rear axle housing, and brake flange; of a bracket secured to the frame; a pair of shackle links pivotally mounted thereon with the free ends of the links extended toward and closely approaching each other; a pair of cantaliver springs, the rear ends of said springs being connected to said brake flange above and below the rear axle, the forward ends of said springs being connected to the free ends of said shackle links; and a block interposed between the centers of said springs and having connection with the chassis frame, all coacting substantially as described and for the purpose specified.

5. In a spring suspension for automobiles, the combination with the chassis frame, rear axle, rear axle housing, and brake flange; of a bracket secured to the frame; a pair of shackle links pivotally mounted thereon one above the other and with the free ends of the links extended toward and closely approaching each other; a pair of cantaliver springs, the rear ends of said springs being connected to said brake flange above and below the rear axle, the forward ends of said springs being connected to the free ends of the shackle links, and a rigid connection between the springs at the centers thereof, said rigid connection having connection with the chassis frame.

6. In a spring suspension for automobiles, the combination with the chassis frame, rear axle, rear axle housing, and brake flange; of a pair of cantaliver springs diverging rearwardly with relation to each other and the rear ends of said cantaliver springs being secured to said brake flange above and below said rear axle, the forward ends of said springs being secured to said frame; and a block interposed between the centers of said springs and having connection with the chassis frame, all coacting substantially as described and for the purpose specified.

7. In a spring suspension for automobiles, the combination with the chassis frame, rear axle, rear axle housing, and brake flange; of a pair of cantaliver springs diverging rearwardly with relation to each other and the rear ends of said cantaliver springs being secured to said brake flange above and below said rear axle adjacent the edges of the brake flange, the forward ends of said springs converging toward each other and being secured to said frame and a block having upper and lower faces converging toward the inner ends of the springs and lying against and secured to the inner faces of the springs, said block having connection with the chassis frame; all coacting substantially as described and for the purpose specified.

8. In a spring suspension for automobiles, the combination of a chassis frame, rear axle, rear axle housings, and a brake flange, of a bracket secured to the frame, a pair of shackle links pivotally mounted on said bracket, the free ends of said links lying in close proximity to each other, a pair of laterally projecting pins disposed on said brake flange above and below the rear axle, a pair of cantaliver springs disposed one above the other, the rear ends of said springs being connected to the pins on said brake flange and the forward ends of said springs being connected to the free ends of the shackle links, and a block interposed between the centers of said springs to connect them together, said block having connection with the chassis frame.

9. In a spring suspension for automobiles, the combination with a chassis frame, rear axle, rear axle housings, and a brake flange, of a bracket rigidly secured to the frame, a pair of shackle links pivotally mounted on said bracket, the free ends of said links lying in close proximity to each other, a pair of laterally projecting pins disposed on said brake flange above and below the rear axle, a pair of cantaliver springs disposed one above the other, the rear ends of said springs being connected to the pins on the said brake flange and the forward ends of said springs being connected to the free inner ends of the shackle links, and a block interposed between the centers of said springs to connect them together, said block having connection with the chassis frame.

In witness whereof, I have hereunto set my hand and seal in the presence of two witnesses.

WALTER S. AUSTIN. [L. S.]

Witnesses:
HENRY F. WALCH,
HADLEY H. WALCH.

Copies of this patent may be obtained for five cents each, by addressing the "Commissioner of Patents, Washington, D. C."